United States Patent [19]

Maekawa

[11] Patent Number: 4,664,590
[45] Date of Patent: May 12, 1987

[54] TRANSPORTABLE ROBOT SYSTEM
[75] Inventor: Hiroshi Maekawa, Joyo, Japan
[73] Assignee: Murata Kikai Kabushiki Kaisha, Kyoto, Japan
[21] Appl. No.: 733,495
[22] Filed: May 10, 1985
[30] Foreign Application Priority Data May 15, 1984 [JP] Japan .................................. 59-97083

[51] Int. Cl.⁴ ............................................ B25J 5/02
[52] U.S. Cl. .................. 414/744 R; 104/89;
     105/29.1; 180/168; 414/279; 901/1; 901/6
[58] Field of Search .............. 414/222, 225, 226, 266,
     414/279, 281, 749, 750, 744 R; 901/1, 6, 7, 8;
     180/168; 104/88, 89, 165, 18; 105/29 R

[56] References Cited

U.S. PATENT DOCUMENTS

| | | | |
|---|---|---|---|
| 2,988,237 | 6/1961 | Devol, Jr. ........................... | 901/7 X |
| 3,223,767 | 12/1965 | Harris .............................. | 425/38 X |
| 3,759,186 | 9/1973 | Sugimoto ....................... | 105/29 R X |
| 3,905,492 | 9/1975 | Maeda et al. ..................... | 414/284 |
| 3,941,985 | 3/1976 | Kawase et al. ................... | 198/341 X |
| 3,987,734 | 10/1976 | Horn ................................ | 104/88 |
| 4,538,950 | 9/1985 | Shiomi et al. ..................... | 414/749 |

OTHER PUBLICATIONS

IBM Technical Disclosure Bulletin, vol. 25, No. 4, Sep. 1982, "Clean Room Robot".

Primary Examiner—Robert J. Spar
Assistant Examiner—Donald W. Underwood
Attorney, Agent, or Firm—Barnes, Kisselle, Raisch, Choate, Whittemore & Hulbert

[57] ABSTRACT

The transportable robot system comprising a plurality of robot working areas, an unmanned transporter for transporting a robot mounted thereon and moving between the robot working areas and a travel track for the unmanned transporter to provide a communication between the areas. The unmanned transporter provides a base to which to robot is mounted and secured, and a locating station for the base is provided near a machine tool in the working area so that the base may be put on the locating station at a predetermined position.

1 Claim, 10 Drawing Figures

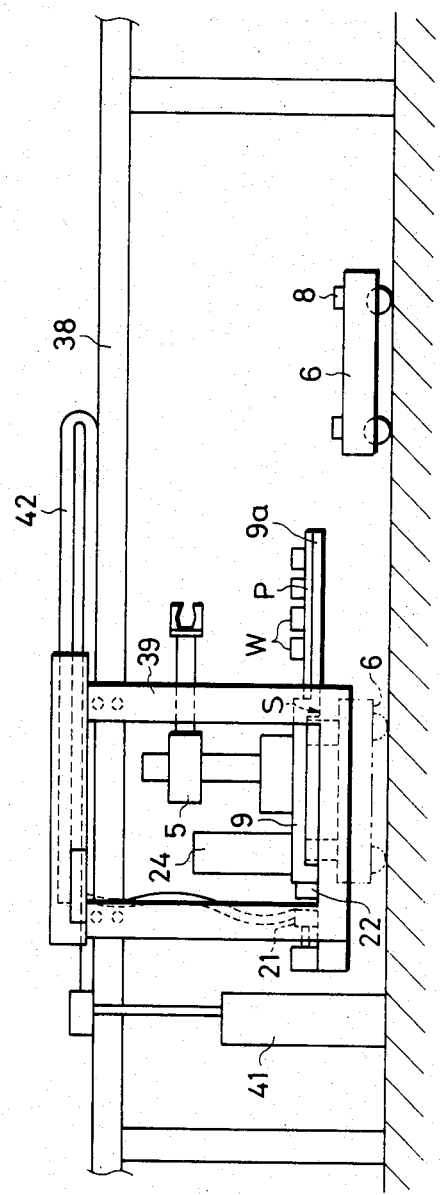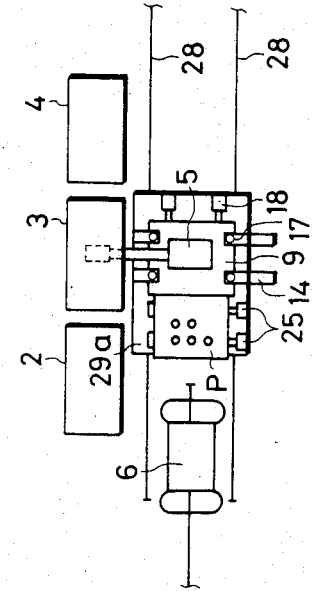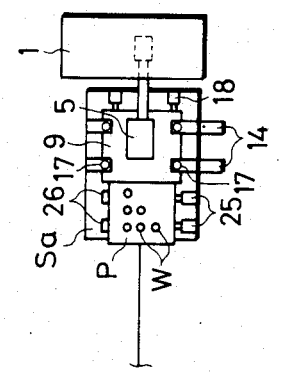

TRANSPORTABLE ROBOT SYSTEM

BACKGROUND OF THE INVENTION

1. Field of the Invention

This invention relates to a new transportable robot system in which a robot may be operated at its high efficiency in factories and the like.

2. Prior Art

Where in machine factories and the like equipped with a plurality of machine tools, supply and removal of work to and from the plurality of machine tools are carried out by robots, it is usual that one work installing and removing robot is provided per one machine tool. However, in this case, where machining time of work by each machine tool is short and work is often installed and removed by the robot, no problem occurs, whereas where machining time is long and the operation rate of the robot for each machine tool is low, the more machine tools are provided, the higher the cost. Further, where the aforementioned machine tools are pre-arranged in a row, the robot is moved and traversed therealong and the common robot may be used between the machine tools. Actually, however, all the machines are rarely arranged in a row in various factories such as machine factories and the like. In most cases, the machines are arranged dispersedly in terms of design of machining steps or of constraint of site condition or the like, and it is impossible to move the robot between a number of machines merely by the traverse function of the robot.

SUMMARY OF THE INVENTION

An object of the present invention is to provide an arrangement wherein a common robot is transported by a transporter to provide a communication between a plurality of robot working areas.

Another object of the present invention is to provide means for transporting and operating the common robot in the plurality of robot working areas.

Still another object of the present invention is to provide a system wherein robots having different functions may be used in one and the same working area.

The transportable robot system of the present invention comprises a plurality of robot working areas, an unmanned transporter for transporting a robot mounted thereon and moving between the robot working areas and a travel track for the unmanned transporter to provide a communication between the areas. The unmanned transporter provides a base to which the robot is mounted and secured, and a locating station for the base is provided near a machine tool in the working area so that the base may be put on the locating station at a predetermined position.

BRIEF DESCRIPTION OF THE DRAWINGS

FIG. 8 is a side view showing a further embodiment of the transverse device in the second working area, FIG. 9 is a schematic plan view showing a further embodiment of a station and a robot loaded base in the first working area, and FIG. 10 is a schematic plan view showing another embodiment of a traverse bogie and a robot loaded base.

DETAILED DESCRIPTION OF THE INVENTION

Preferred embodiments will be described hereinafter in connection with the accompanying drawings.

Figure 1:
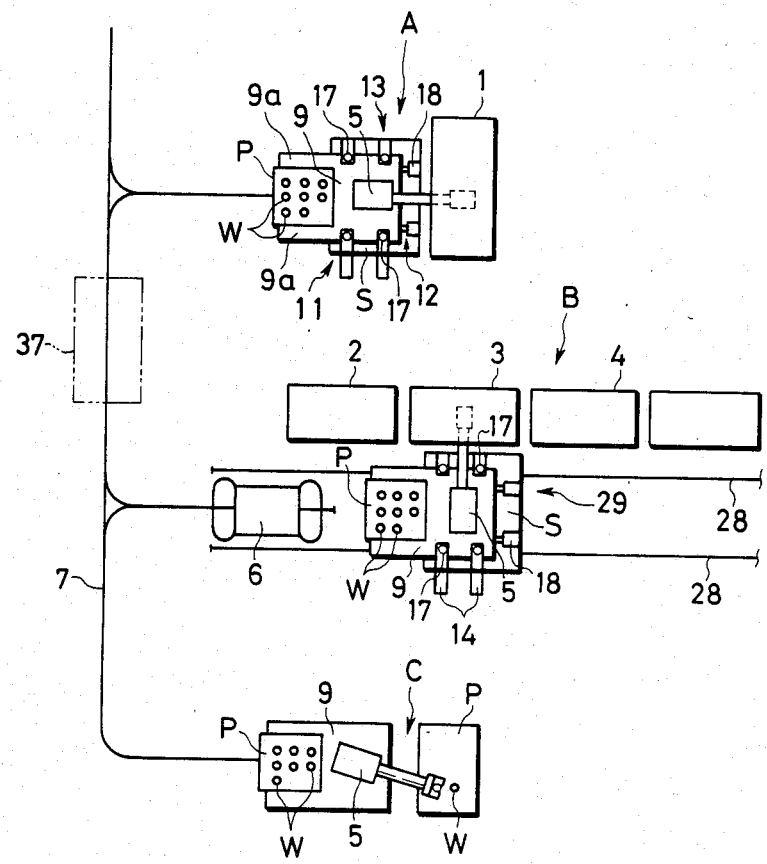
FIG. 1 is a schematic arrangement view in plan of a shop which employs a transportable robot system according to the present invention.

FIG. 1 is a schematic plan arrangement view of a work machining factory which employs a transportable robot system in accordance with the present invention, comprising a first work machining area A comprising one machine tool 1, a second work machining area B comprising a number of machine tools 2, 3, ..., and a machined work taking out area C for loading a machined work W on a pallet P and taking it out by a conveyor or a forklift not shown. These working areas A, B and C simultaneously function as a working area by a robot 5, that is, the first and second work machining areas A and B function as a work installing and removing working areas A and B by the robot 5, and the taking out area C functions as a loading working area C. However, on the floor there is laid a travel track 7 for an unmanned transporter 6 to provide a communication between the areas A, B and C, and the robot 5 may be freely transported and moved between the areas by the unmanned transporter 6 which travels on the track 7.

While in this embodiment, the unmanned transporter 6 is of an electromagnetic guiding type in which batteries are mounted and the transporter can self-run while detecting from a pick-up coil a magnetic field induced from an electric wire, it should be noted that the transporter can be of other type, for example, an optical guiding type, or one which runs on a fixed rail or a manned transporter as the case may be. However, it is necessary for the transporter 6 to be provided with a robot lifting lifter 8.

Construction of the aforesaid areas A, B and C and a base 9 to which the robot 5 is mounted and secured will now be described in detail.

Figure 2:
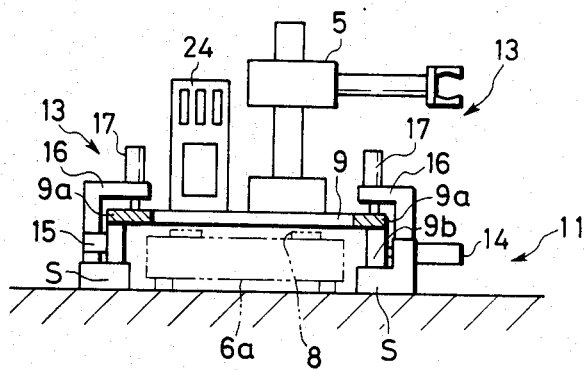
FIG. 2 is a partially longitudinal sectional view of a robot loaded base locked to a station in a first working area.
Figure 3:
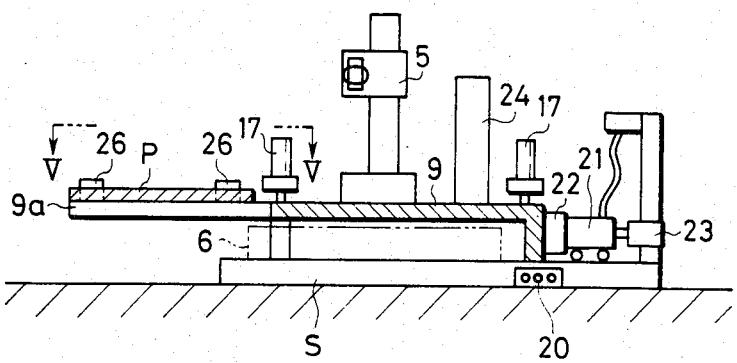
FIG. 3 is likewise a partially longitudinal sectional view.
Figure 4:
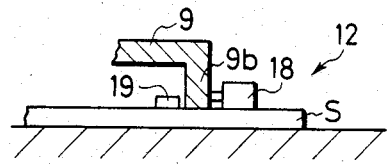
FIG. 4 is likewise a side view showing a locating device in a direction of axis Y.

First, the first work machining area (the first work installing and removing working area) A will be described with reference to FIGS. 2 to 4. In the area A, a locating station S for a base 9 to which the robot 5 is secured is provided near the aforesaid machine tool 1, and when the base 9 with the robot mounted thereon is transported by the unmanned transporter 6 onto the station S it is lowered to actuate locating devices 11, 12 and 13 in X, Y and Z directions on the station S, the base 9 is locked to an accurate position on the station S to accurately establish the relative position of the robot 5 with respect to the machine tool 1.

That is, the aforesaid base 9 is in the shape in which a horizontally extending pallet loading branched fork-like portion 9a is extended on a box-shaped upper surface and the station S is in the shape of a plane in which a portion on the side where the transporter 6 is moved in and out is open. The base 9 is forced toward a touch portion 15 on the side of the other station by a pressing cylinder 14 provided on the side of the station S to thereby provide locating in a direction of axis X, the base 9 is forced toward the upper surface of the station S by a pressing cylinder 17 stood upright on a bracket 16 to thereby provide locating in a direction of axis Z, and a leg 9b of the base 9 is forced toward a locating pin 19 projected on the station S by a pressing cylinder 18 provided on the other side of the station S (FIG. 4) to thereby provide locating in a direction of axis Y. The aforesaid pressing cylinder 17 in a direction of axis Z is provided not only to provide locating but prevent the robot 5 from being overturned. Since in this embodiment, the locating device 12 in a direction of axis Y comprises the pressing cylinder 18 and the fixed pin 19 on the station S, when the base 9 is introduced by the transporter 6, it has to be introduced while supporting the base 9 at a level over the fixed pin 19 by the lifter 8. However, if the fixed pin 19 is replaced by a pin which is free to move above and below the upper surface of the station, the supporting level of the base 9 by the transporter at the time of introduction can be lowered. The construction of the locating devices 11, 12 and 13 is not limited to that which uses the pressing cylinders 14, 18 and 17 but various other devices can be used.

A reference numeral 21 designates a power source connection box connected to the base 9 secured onto the station by the aforesaid locating device, 22 a connector on the side of the base 9, and 23 a pusher cylinder for connection and disengagement. Transmitting and receiving signals between the power source and peripheral devices are provided for a robot control board 24 on the base 9 through the connection box 21 and connector 22. Furthermore, a signal receiving and transmitting device 20 for a signal for signal exchange relative to the peripheral devices is provided in the station S. If the signal receiving and transmitting device 20 comprises a photoelectric tube, it can be directly mounted on the robot 5, on the base 9 or on the control board 24.

Figure 5:
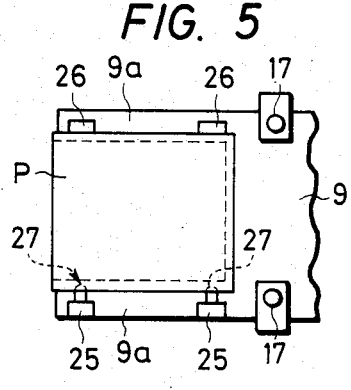
FIG. 5 is a view taken on line V—V of FIG. 3.

Next, the base 9 on which the robot 5 is mounted will be described. The base 9 has the branched fork-like portion 9a as previously mentioned, and the pallet P with a work W placed thereon is loaded on the fork-like portion 9a whereby the pallet P may be forced against a touch portion 26 on one side by the pressing cylinder 25 provided on the fork-like portion 9a to thereby locate it to an accurate position with respect to the base 9. A rod end 27 of the pressing cylinder 25 is in the shape of a wedge as shown in FIG. 5, and a recess in which said wedge-like end is fitted is formed in the side of the pallet P to provide locating in a direction of axes X and Y.

While in this embodiment, the robot 5 mounted on base 9 used is of the cylindrical coordinate type, it should be understood of course that any other kind of robot could be used.

Next, the second work machining area (the second work installing and removing working area) B will be described with reference to FIGS. 6 to 8. In the area B, a number of machine tools 2, 3, 4, . . . are arranged in a row and a traversing rail 28 is laid along the row of the machine tools 2, 3, 4, . . . whereby a bogie 29 travels on the rails 28 and the robot 5 on the traversing bogie 29 is operated to install and remove work of the machine tools 2, 3, 4, . . .

Figure 7:
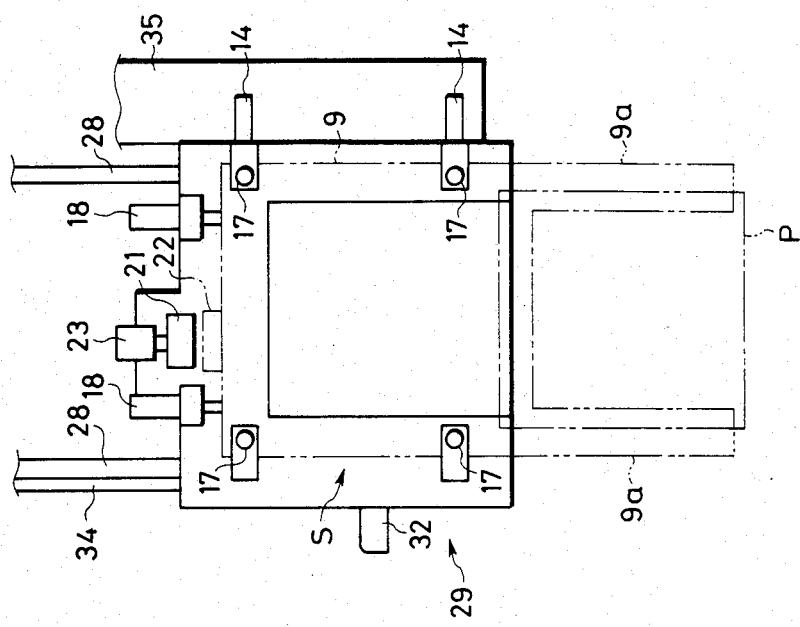
FIG. 7 is likewise a plan view with a base and a pallet removed.
Figure 6:
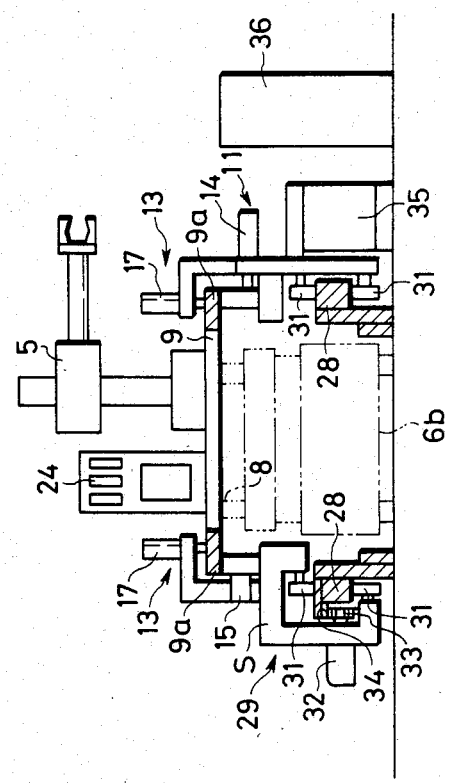
FIG. 6 is a partially longitudinal sectional front view of a robot loaded base locked to a traverse bogie in a second working area.

The traverse bogie 29 has its upper portion which has the same construction as that of the aforementioned station S, as shown in FIGS. 6 and 7, and the base 9 with the robot mounted thereon may be locked to an accurate position with respect to the traverse bogie 29 (in which parts having the same construction bear the same reference numerals, description of which will be omitted). The lower travelling portion will be described.

This travelling portion is movably supported on the rail 28 by means of a supporting rollers 31 which support both rails 28 from above and below, and a pinion gear 33 on the shaft end of a drive motor 32 provided on the side thereof is meshed with a rack 34 formed integral with the rail 28 to thereby provide travelling thereof. A reference numeral 35 denotes a flexible cable for a supply of power to the traverse bogie 29 and for exchange of signal, and power source and signal connected to the traverse bogie 29 through the cable 35 are connected to the robot 5 through the box 21 and connector 22 in a manner similar to that of the first area A. A reference numeral 36 denotes a control for the traverse device.

Since in the above-described embodiment, the traverse bogie 29 in the second machining area 5 has its travelling portion at the lower portion thereof, the station S portion is positioned above the floor and the unmanned transporter 6 is also bulky of the type which the robot loaded base 9 is lifted at a high position by the lifter 8. Therefore, when the robot loaded base 9 is moved alternately between the first and second areas A and B, such operation is carried out through a transfer device 37 such as a ceiling crane which transfers the base 9 between the transporters 6a and 6b, or a pit is formed under the station S in the area A so that the bulky transporter 6b for the second area B may be downwardly moved into the pit and moved under the station S in the first area A. However, if a device of the following type is used as the traverse device for the robot loaded base 9 in the second area B, the same low transporter 6a may be used to carry out the transporting within the entire system.

That is, it can be designed as shown in FIG. 8 that a rail 38 is installed at a height as required on the floor, the lower surface of a suspension frame 39 moving along the rail 38 is formed into the station S of the same construction as that mentioned above whereby the robot loaded base 9 is placed on the station S by the transporter 6. Parts of the same construction on the station S bear the same reference numerals as those previously mentioned, description of which will be omitted. Of course, the locating devices 11, 12 and 13 for the base 9 are mounted also on the station S of the moving suspension frame 39 though not shown.

A reference numeral 41 designates a control device for the moving suspension frame 39, which control device is connected to the box 21 on the station S through a flexible cable 42 similar to that as previously described and further connected to the robot 5 and the robot control board 24 through the connector 22.

Next, the taking out area (the loading working area) C will be described. In the area C, a locating and anchoring device for the transporter 6 with the base 9 loaded thereon and an empty pallet P are provided. In the area C, a finished work W is picked from the pallet P on the base 9 while the robot 5 is stayed on the transporter 6 to transfer it to the taking out pallet P.

Having been designed, machining and transportation of work W in the machining shop are carried out in the following procedure.

That is, installing and removing of work W in the first machining area A comprise carrying the robot loaded base 9 onto the station S of the position A by the unmanned transporter 6, lowering the lifter 8 to transfer the base 9 to the upper surface of the station, thereafter actuating the locating devices 11, 12 and 13 to lock the base 9 to a predetermined accurate position on the station S, allowing the robot 5 to effect predetermined operation on the locked base 9, setting the work W on the pallet P preset on the base 9 to the machine tool 1, or unloading the work w on the pallet P from the machine tool 1.

If loading of the robot loaded base 9 on the station S by the transporter 6 and locking of the base 9 to the station S have been finished, the transporter 6 may be freely disengaged from the station S and moved freely to the other working areas B and C or to the other station. If necessary, the pallet locating device 25 on the base 9 may be removed to separate the pallet P from the base 9 to transport only the pallet P with the work placed thereon to other working areas B and C. When work installing and removing operation by the robot 5 in the first machining area A is finished, a command is provided to again return the transporter 6 to the first area A from other working areas B and C, and the base 9 is transferred onto the transporter 6 to take it out from the station S in the step conversely to that as previously mentioned.

While the pallet P is set onto the base 9 and separated from the base 9 by vertical movement of the lifter 8 of the transporter 6, it should be noted of course that such operation can be made even in the pallet setting station not shown.

Next, in installing and removing of the work W in the second machining area B, first the traverse bogie 29 or the moving suspension frame 39 is moved to the base loaded position by the transporter 6 at the distal end of the rails 28 and 38, and the base 9 loaded on the transporter 6 is transferred by the downward movement of the lifter 8 onto the station S carried to the rail end position. Then, the base 9 transferred to the station S is locked by the locating devices 11, 12 and 13 in a manner similar to that as previously mentioned, and when locking is finished, the transporter 6 is disengaged from the station S position for free movement to other working areas A and C.

The robot loaded base 9 locked at the station S is moved on the rails 28 and 38, and work W is picked by the robot 5 from the pallet P on the base 9 to set it to the machine tools 2, 3, 4, . . . , or the machined work W unloaded from the machine tools 2, 3, 4, . . . is placed on the pallet P.

Even in the second machining area B, if necessary, the traverse bogie 29 or the moving suspension frame 39 may be suitably returned to the distal ends of the rails 28 and 38 to transfer only the pallet P to the transporter 6 for exchange of the pallet P by the transporter 6.

Since in the second machining area B, the traverse device such as the traverse bogie 29 or the moving suspension frame 39 is used, this is suitable for the case where frequent movement is effected between the machine tools 2, 3, 4, . . . , that is, the case where machining time in connection with the individual machine tools 2, 3, 4, . . . is short.

In the taking out area C, high accuracy of placing and locating of work on the taking out pallet P is not required, and therefore, finished work W is transferred from the pallet P on the base 9 to the taking out pallet P while the robot 5 remains loaded on the transporter 6, as previously mentioned. However, the station S similar to that of the first machining area A can be provided also in the taking out area C as necessary, in which case after the base 9 has been locked to the station S, the transporter 6 which has transported the robot loaded base 9 to the area C may be moved away from the area C and moved to the other working area for accomplishment of the other operation.

Since in the above-described embodiment, the fork-like portion 9a is provided in the robot loaded base 9 so that the pallet P may be placed on the base 9 itself, where the robot 5 is operated while placing the base on another traverse bogie 29 for movement, the robot 5 and the work W placed pallet P are made integral with each other for traversing and therefore, work may be installed and removed from a number of machine tools (object machines) in a short period of time, which forms a merit. However, as schematically shown in FIG. 9, it can be designed so that the base 9 is merely provided to load only the robot 5 thereon, the station S is frontwardly extended for use thereof for the purpose of setting the pallet P and said pallet locating device 25 is provided on said extended portion Sa. In the embodiment shown in FIG. 10, an extended portion 29a capable of placing a pallet as described above is provided on the traverse bogie 29.

In the base 9 loaded robot 5 which is transported between the plurality of working areas A, B and C and used in common, the smaller the number of units the lower the cost of the entire machining shop, and the operation rate of the robot is enhanced. It is noted however that the number of robots is not limited to one as in the abovedescribed embodiment but for example, a plurality of robots having different kinds of hands can be respectively used in common between the working areas A, B and C, in which case the working contents carried out by the robots with respect to the machine tools become increased, and more complicated steps can be accomplished by the robots.

In either case, as will be apparent from the above-described description, the present invention provides an arrangement wherein a common robot is transported by a transporter to provide a communication between a plurality of robot working areas, and the common robot is operated in each of the plurality of robot working areas. Therefore, in the shops where a number of object machines are provided, even if the object machines are dispersedly arranged, operations such as installing and removing of work may be achieved by the minimum number of robots. Moreover, since robots having different functions may be used in one and the same working area, the working contents effected by the robots in one and the same working area may be increased, and more complicated steps may be achieved by the robot.

What is claimed is:

1. A transportable robot system comprising means providing a plurality of spaced apart working areas each near a machine tool and each having a locating station, a common robot having a base, an unmanned transporter adapted to support said robot, transporter guide means leading to each of said working areas, means for moving said transporter along said guide means to deliver said robot to or withdraw it from the locating station of any one of said working stations, means for releasably securing said robot base to the locating station of each of said working areas, means for operating said securing means to secure said robot base to the locating station of any one of said working areas upon delivery of said robot thereto by said transporter, and means for operating said securing means to release said robot base at the locating station of any one of said working areas for withdrawal of said robot therefrom by said transporter, said base being constructed in the shape in which a horizontally extending pallet loading branched fork-like portion is extended on a box-shaped upper surface and each locating station being constructed in the shape of a plane in which a portion on the side where the transporter is moved in and out is open, a pallet being accurately located on the base by a pressing cylinder provided on the fork-like portion of the base, a rod end of said pressing cylinder being in the shape of a wedge, and a recess formed in the side of the pallet, said wedge-like end of the rod being fitted in the recess.

* * * * *